United States Patent Office 2,731,338
Patented Jan. 17, 1956

2,731,338
EMULSIFYING AND DISPERSING AGENTS

Elmer A. Fike, Nitro, W. Va., and Henry L. Morrill, Clayton, Mo., assignors to Monsanto Chemical Company, St. Louis, Mo., a corporation of Delaware No Drawing. Application January 5, 1951, Serial No. 204,688

11 Claims. (Cl. 71—2.6)

This invention relates to new emulsifying and dispersing agents and comprises new combinations the ingredients of which exert a synergistic action, neither component alone being effective.

The rapid growth of agricultural chemicals which are applied by spraying has created a demand for efficient emulsifying and dispersing agents which may be mixed directly with the active component and the composition marketed containing the emulsifying or dispersing agent. Compounding liquids, pastes and powders at the time and place of application is inconvenient and a nuisance. Furthermore an improperly formulated product will not give satisfactory results and manufacturers do not care to entrust their reputations to amateurs. These difficulties can largely be circumvented by marketing an emulsifiable concentrate or a dispersible powder. However, the specifications for an emulsifying agent for use in packaged goods which must withstand storage are exacting. The passage of time and changes of temperature encountered in normal storage often wreak havoc with emulsifying and dispersing properties. The active ingredient may react with the emulsifying agent or be adversely affected by it over a period of time. For instance soaps as well as most synthetic detergents are distinctly alkaline in reaction and may contain free caustic soda and are therefore unsuitable for use with materials sensitive to alkali. The compositions of this invention are not only extremely efficient emulsifying agents for a wide variety of compositions but are essentially neutral and buffered against changes in pH.

In accordance with this invention it has been discovered that the combination of an amine salt of an alkylated aromatic sulfonic acid and an alkylene oxide condensation product of a long chain aliphatic compound comprise very effective neutral buffered emulsifying and dispersing agents. The combinations fulfilled the rigorous requirement of emulsifying and dispersing agents which would withstand storage as concentrates.

The alkylene oxide condensates are a well known group of wetting agents and detergents, many of which are available under trade names. These products are derived from long chain aliphatic materials such as long chain fatty acids, as for example tall oil, either crude or refined, condensed with ethylene oxide in ratios varying from 1 to 16 moles of ethylene oxide per mole of tall oil. It has been found, however, that better results are obtained with higher molar ratios, for example products obtained by condensing 100 parts by weight of tall oil with 140 or 160 or 210 parts by weight of ethylene oxide. The condensation product of oleic acid with 10–15 moles of ethylene oxide per mole of oleic acid gives good results in the new compositions. Further examples are the alkylene oxide condensates of mercaptans such as octyl mercaptan, nonyl mercaptan, decyl mercaptan, undecyl mercaptan, and dodecyl mercaptan with 7 to 15 moles of ethylene or propylene oxide or mixtures thereof.

The alkylated aromatic sulfonates in the form of their sodium and amine salts are well known synthetic wetting agents and detergents. The amine salts of alkylated aromatic sulfonates containing 9–15 carbon atoms in the side chain are particularly contemplated here. These amine salts may be made by dissolving the crude sulfonic acid in benzene or other solvent and separating the lower sulfuric acid layer. The amine is added and the solvent removed by distillation and the residue blended with the alkylene oxide condensate. If $SO_3$ is employed for the sulfonation instead of concentrated sulfuric acid, the salt separation step is of course eliminated. The presence of appreciable quantities of salt will result in a turbid concentrate. Some of the newer insecticides are sensitive to water so it is important in these instances to make sure that the emulsifying agent is anhydrous for the purpose of preparing emulsifiable concentrates.

Typical amines for the preparation of amine salts comprise methylamine, ethylamine, propylamine, isopropylamine, butylamine, isobutylamine, amylamine, cyclohexylamine, ethanolamine, diethanolamine, diethylamine, dibutylamine, dicyclohexylamine, octylamine and dodecylamine. For example, good results may be obtained with cyclohexylammonium dodecylbenzenesulfonate, cyclohexylammonium decylbenzenesulfonate, dicyclohexylammonium decylbenzenesulfonate, dodecylammonium dodecylbenzenesulfonate, octylammonium dodecylbenzenesulfonate, mixed amylammonium dodecylbenzenesulfonate and butylammonium dodecylbenzene sulfonate.

In general useful results are achieved by employing from 10 to 50% of the amine salt, the alkylene oxide condensate comprising 90 to 50% of the mixture. Both the amine salt and the alkylene oxide condensate may be made up of mixtures of each. Optimum proportions are usually reached at somewhat more than 10% of the amine salt, preferably 20 to 40%.

A typical composition designated as Emulsifier A comprises

Emulsifier A

| | Parts by weight |
|---|---|
| Butylamine salt of dodecylbenzenesulfonic acid | 35 |
| Tall oil condensed with ethylene oxide in the ratio of 11 moles ethylene oxide to 1 mole tall oil | 65 |

This composition is soluble in organic solvents. For example a 10% solution in xylene is clear. Its use in an emulsifiable concentrate of Parathion, which is O,O-diethyl O-p-nitrophenyl thiophosphate, is illustrated by a composition comprising

| | Parts by weight |
|---|---|
| Parathion | 33⅓ |
| Xylene | 56⅔ |
| Emulsifier A | 10 |

This composition is practically self-emulsifying on adding to water and produces a stable emulsion.

An emulsifiable concentrate of DDT, 1,1,1-trichloro-2,2-bis(p-chlorophenyl)ethane, may be made as follows:

| | Parts by weight |
|---|---|
| DDT | 25 |
| Xylene | 72.5 |
| Emulsifier A | 2.5 |

The concentrate is storage stable and readily emulsifiable on admixture with water.

Benzene hexachloride may also be prepared in the form of an emulsifiable concentrate by use of the new emulsifier. For instance a composition which has given excellent results comprises

| | Parts by weight |
|---|---|
| Lindane | 11.4 |
| Petroleum solvent | 83.6 |
| Emulsifier A | 5.0 |

Chlordan, which chemically is reported to be 1,2,4,5,6,7,8,8 - octachloro - 2,3,3a,4,7,7a-hexahydro-4,7-methanoindene, is a well known insecticide which can be readily prepared in the form of an emulsifiable concentrate by use of the emulsifying combination. Employing kerosene as the solvent, a satisfactory composition comprises

| | Parts by weight |
|---|---|
| Chlordan | 39.4 |
| Kerosene | 60.6 |
| Emulsifier A | 2.5 |

If a higher concentration of the insecticide is used it is desirable to increase the proportion of emulsifier. For instance with 44–75% solutions of chlordan it is preferable to use 6–12% of Emulsifier A. Toxaphene, a similar type product described as a chlorinated camphene, may be emulsified in the presence of Emulsifier A and a water immiscible solvent. For example 4 pounds of Toxaphene per gallon of xylene to which is added 5% Emulsifier A on the total weight of the solution represents a typical emulsifiable concentrate. Another typical composition is represented by 6 pounds of Toxaphene per gallon of xylene containing 7.5% Emulsifier A on the total weight of the solution.

Esters of 2,4-dichlorophenoxyacetic acid and 2,4,5-trichlorophenoxyacetic acid may be emulsified in similar manner. These acids are well known herbicides, commonly known as 2,4-D and 2,4,5-T respectively. The formation of a stable emulsion is aided by adjusting the specific gravity of the solution to approximately 1 by admixture with suitable oils in which case stable emulsions are produced with 2.5% Emulsifier A on the solution. If the specific gravity is not adjusted, it is preferable to employ higher proportions of emulsifier, as for example 5.0 to 7.5% on the solution.

The alkylxanthogen disulfides, as for example ethylxanthogen disulfide (diethyl dithiobis(thionoformate)), are illustrative of products sensitive to alkali. However, both the emulsions and emulsifiable concentrates are stable in the presence of the emulsifying compositions of this invention. An admixture of equal parts by volume of ethylxanthogen disulfide and petroleum solvent may be converted to an emulsifiable concentrate by the addition of 1 to 5% by weight of Emulsifier A based on the weight of the solution. The composition is essentially self-emulsifying and retains its emulsifying properties on storage. Additionally, tests at elevated temperatures reveal that the concentrate is stable whereas a similar composition prepared without the amine salt decomposes rapidly. Furthermore, the emulsifying characteristics are decidedly inadequate with either ingredient alone.

A further example of an emulsifying composition comprises

*Emulsifier B*

| | Parts by weight |
|---|---|
| Butylamine salt of dodecylbenzenesulfonic acid | 20 |
| Tert. dodecyl mercaptan condensed with ethylene oxide in the ratio of 170 parts by weight of ethylene oxide per 100 parts of mercaptan | 80 |

A solution of equal parts by volume of ethylxanthogen disulfide and petroleum solvent containing 1–5% Emulsifier B on the weight of the solution is also self-emulsifying and stable to storage.

Still further examples of emulsifying compositions are set forth below:

*Emulsifier C*

| | Parts by weight |
|---|---|
| Isopropylamine salt of dodecylbenzenesulfonic acid | 35 |
| 1 mole tall oil condensed with substantially 11 moles ethylene oxide | 65 |

The emulsifying characteristics of ethylxanthogen disulfide solutions in the presence of this emulsifier were examined. While the stability of the xanthate in the presence of this emulsifier was fully equivalent to that of previously described compositions, the emulsifying activity was slightly inferior to that of Emulsifiers A and B. In general, the optimum activity appears to be reached with the butylamine salt of dodecylbenzenesulfonic acid.

*Emulsifier D*

| | Parts by weight |
|---|---|
| Cyclohexylamine salt of dodecylbenzenesulfonic acid | 35 |
| 1 mole tall oil condensed with 11 moles of ethylene oxide | 65 |

The properties of this composition are very similar to those of Emulsifier C.

*Emulsifier E*

| | Parts by weight |
|---|---|
| Butylamine salt of dodecylbenzenesulfonic acid | 35 |
| 1 mole tall oil condensed with 11 moles ethylene oxide | 40 |
| 1 mole tert. dodecyl mercaptan condensed with 7.8 moles ethylene oxide | 25 |

The properties of this composition are almost indistinguishable from those of Emulsifier A.

*Emulsifier F*

| | Parts by weight |
|---|---|
| Butylamine salt of dodecylbenzenesulfonic acid | 40 |
| 1 mole tall oil condensed with 11 moles ethylene oxide | 50 |
| 1 mole tert. dodecyl mercaptan condensed with 7.8 moles ethylene oxide | 10 |

This composition is an efficient emulsifier for many insecticides, fungicides and herbicides. In general the new compositions are useful for emulsifying any material which can be dissolved in a water immiscible solvent. Thus, they have proved to be useful with other materials than those specifically enumerated above. Excellent emulsifiable concentrates of tetraethyl pyrophosphate have been prepared. With this type material it is essential that the emulsifier be essentially anhydrous as it is susceptible to hydrolysis. Additionally the new compositions, specifically Emulsifier A above, are extremely efficient with the insecticides aldrin and dieldrin. For the preparation of wettable powders the dry ingredient is mixed directly with the dispersant. Dry powders which have a small proportion of the dispersant absorbed thereon are quickly wetted and dispersed on contact with water.

Although the invention has been described and illustrated by reference to many specific examples, it will be understood that it is not limited thereto.

What is claimed is:

1. As a new composition, a homogeneous mixture of wetting agents for emulsifying and dispersing insoluble substances in water which mixture is soluble in water and organic solvents and consists essentially of 10–50% by weight of an amine salt of an alkylated benzene sulfonic acid containing at least 9 but not more than 16 carbon atoms in the alkyl group, wherein the amine salt forming group contains at least one hydrogen atom on the nitrogen and at least one organic radical containing less than 13 carbon atoms and said amine is selected from the group consisting of alkyl amines, ethanolamines, cyclohexylamines and 50–90% by weight of an alkylene oxide condensate of a long chain aliphatic compound selected from the group consisting of tall oil condensed with 10–15 moles of ethylene oxide per mole of tall oil, mercaptans containing at least 8 but not more than 12 carbon atoms condensed with 7–15 moles of ethylene oxide per mole of mercaptan, and mixtures thereof.

2. As a new composition, a homogeneous mixture of wetting agents for emulsifying and dispersing insoluble substances in water which mixture is soluble in water and organic solvents and consists essentially of 20–40% by weight of an amine salt of an alkylated benzene sulfonic acid containing at least 9 but not more than 16 carbon atoms in the alkyl group wherein the amine salt forming group is an alkyl amine containing at least one hydrogen atom on the nitrogen and at least one alkyl group of less than 13 carbon atoms and 80–60% by weight of the condensation product of one mole of tall oil and 10–15 moles of ethylene oxide.

3. As a new composition, a homogeneous mixture of wetting agents for emulsifying and dispersing insoluble substances in water which mixture is soluble in water and organic solvents and consists essentially of 20–40% by weight of an amine salt of an alkylated benzene sulfonic acid containing at least 9 but not more than 16 carbon atoms in the alkyl group wherein the amine salt forming group is an alkyl amine containing at least one hydrogen atom on the nitrogen and at least one alkyl group of less than 13 carbon atoms and 80–60% by weight of the condensation product of an aliphatic mercaptan containing at least 8 but not more than 12 carbon atoms with 7–15 moles of ethylene oxide per mole of mercaptan.

4. As a new composition, a homogeneous mixture of wetting agents for emulsifying and dispersing insoluble substances in water which mixture is soluble in water and organic solvents and consists essentially of about 35% by weight of the monobutylamine salt of dodecyl benzene sulfonic acid and about 65% of the condensation product of one mole of tall oil and 10–15 moles of ethylene oxide.

5. As a new composition, a homogeneous mixture of wetting agents for emulsifying and dispersing insoluble substances in water which mixture is soluble in water and organic solvents and consists essentially of about 20% by weight of the monobutylamine salt of dodecyl benzene sulfonic acid and about 80% of the condensation product of one mole of dodecyl mercaptan and 7–15 moles of ethylene oxide.

6. As a new composition, a homogeneous mixture of wetting agents for emulsifying and dispersing insoluble substances in water which mixture is soluble in water and organic solvents and consists essentially of about 35–40% by weight of the monobutylamine salt of dodecyl benzene sulfonic acid, about 40–50% by weight of the condensation product of one mole of tall oil and 10–15 moles of ethylene oxide and about 10–25% of the condensation product of one mole of dodecyl mercaptan and 7–15 moles of ethylene oxide.

7. An emulsifiable concentrate consisting essentially of a solution in a water immiscible solvent of a pesticide and, as the emulsifying and dispersing aid, a mixture of wetting agents and detergents consisting essentially of 10–50% by weight of an amine salt of an alkylated benzene sulfonic acid containing at least 9 but not more than 16 carbon atoms in the alkyl group, wherein the amine salt forming group contains at least one hydrogen atom on the nitrogen and at least one organic radical containing less than 13 carbon atoms and said amine is selected from the group consisting of alkyl amines, ethanolamines, cyclohexylamines and 50–90% by weight of an alkylene oxide condensate of a long chain aliphatic compound selected from the group consisting of tall oil condensed with 10–15 moles of ethylene oxide per mole of tall oil, mercaptans containing at least 8 but not more than 12 carbon atoms condensed with 7–15 moles of ethylene oxide per mole of mercaptan, and mixtures thereof.

8. An emulsifiable concentrate consisting essentially of a solution in a water immiscible solvent of the toxicant O,O-diethyl O-p-nitrophenyl thiophosphate and, as the emulsifying and dispersing aid, a mixture of wetting agents consisting essentially of 20–40% by weight of an amine salt of an alkylated benzene sulfonic acid containing at least 9 but not more than 16 carbon atoms in the alkyl group wherein the amine salt forming group is an alkyl amine containing at least one hydrogen atom on the nitrogen and at least one alkyl group of less than 13 carbon atoms and 80–60% by weight of the condensation product of one mole of tall oil and 10–15 moles of ethylene oxide.

9. An emulsifiable concentrate consisting essentially of a solution in a water immiscible solvent of the toxicant 1,1,1-trichloro-2,2-bis(p-chlorophenyl)ethane and, as the emulsifying and dispersing aid, a mixture of wetting agents consisting essentially of 20–40% by weight of an amine salt of an alkylated benzene sulfonic acid containing at least 9 but not more than 16 carbon atoms in the alkyl group wherein the amine salt forming group is an alkyl amine containing at least one hydrogen atom on the nitrogen and at least one alkyl group of less than 13 carbon atoms and 80–60% by weight of the condensation product of one mole of tall oil and 10–15 moles of ethylene oxide.

10. An emulsifiable concentrate consisting essentially of a solution in a water immiscible solvent of ethyl xanthogen disulfide and, as the emulsifying and dispersing aid, a mixture of wetting agents consisting essentially of 20–40% by weight of an amine salt of an alkylated benzene sulfonic acid containing at least 9 but not more than 16 carbon atoms in the alkyl group wherein the amine salt forming group is an alkyl amine containing at least one hydrogen atom on the nitrogen and at least one alkyl group of less than 13 carbon atoms and 80–60% by weight of the condensation product of one mole of tall oil and 10–15 moles of ethylene oxide.

11. An emulsifiable concentrate consisting essentially of a solution in a water immiscible solvent of the toxicant comprising an ester of 2,4-dichlorophenoxyacetic acid and, as the emulsifying and dispersing aid, a mixture of wetting agents consisting essentially of 20–40% by weight of an amine salt of an alkylated benzene sulfonic acid containing at least 9 but not more than 16 carbon atoms in the alkyl group wherein the amine salt forming group is an alkyl amine containing at least one hydrogen atom on the nitrogen and at least one alkyl group of less than 13 carbon atoms and 80–60% by weight of the condensation product of one mole of tall oil and 10–15 moles of ethylene oxide.

References Cited in the file of this patent

UNITED STATES PATENTS

| Number | Name | Date |
|---|---|---|
| 1,970,578 | Schoeller | Aug. 21, 1934 |
| 2,205,950 | Flett | June 25, 1940 |
| 2,447,475 | Kaberg | Aug. 17, 1948 |
| 2,509,233 | Kaberg | May 30, 1950 |
| 2,642,400 | Harris | June 16, 1953 |

FOREIGN PATENTS

| Number | Country | Date |
|---|---|---|
| 642,533 | Germany | Mar. 8, 1937 |